United States Patent Office 3,193,568
Patented July 6, 1965

3,193,568
POLYFUNCTIONAL ISOCYANATES CONTAINING INORGANIC ATOMS
Harold Crosbie Fielding and John Maclelland Pollock, Northwich, England, assignors to Imperial Chemical Industries Limited, Millbank, London, England, a corporation of Great Britain
No Drawing. Filed Aug. 9, 1962, Ser. No. 215,792
Claims priority, application Great Britain, Aug. 11, 1961, 29,057/61
6 Claims. (Cl. 260—448.8)

This invention relates to novel polyfunctional isocyanates containing inorganic atoms and to a method for making them.

The reactions between covalent inorganic halides, for example phosphorus trichloride or silicon tetrachloride, and metal cyanates such as sodium cyanate or silver cyanate give inorganic isocyanates in which the isocyanate groups are highly reactive. In some of the polymer-forming reactions undergone by these isocyanates their high reactivity may be a disadvantage since the reactions may take place too quickly to be controlled effectively. We have now made polyfunctional isocyanates containing inorganic atoms in which the reactivity of the isocyanate groups is reduced though it still is substantially greater than it is in organic isocyanates such as toluylene diisocyanate.

According to our invention we provide novel polyfunctional isocyanates having the general formula $$M(OCH_2NCO)_x$$

where M represents a silicon or phosphorus atom or the phosphoryl radical

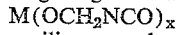

and $x$ is respectively 4, 3 or 3. We also provide a process for making these novel polyfunctional isocyanates comprising in a first stage heating the halide $MQ_x$, where Q represents a halogen other than fluorine, that is, bromine, chlorine, or iodine with formaldehyde to give a halomethyl derivative having the general formula $$M(OCH_2Q)_x$$

and after separation reacting said halomethyl derivative in a second stage with a metal cyanate in an inert anhydrous solvent medium whereby halogen is replaced by the isocyanate radical.

As halides it is convenient to use the chlorides phosphorus trichloride, phosphoryl trichloride and silicon tetrachloride, and suitable metal cyanates are sodium cyanate and silver cyanate. Benzene is a convenient solvent medium.

In one way of carrying out the first stage of the process the chloride is heated with paraformaldehyde in a closed pressure vessel at 100°–200° C. for several hours. The pressure developed is the autogenous pressure and is usually between 20 and 50 atmospheres. The chloromethyl derivative, for example tetra(chloro-methyl) silicate $Si(OCH_2Cl)_4$, after separation from the liquid products by fractionation is then refluxed with a suspension of the metal cyanate in an inert, anhydrous solvent, medium, for example benzene, after which the metal chloride is separated and the liquid phase fractionated to obtain the isocyanate.

The novel isocyanates of our invention react with compounds containing reactive hydrogen atoms in ways similar to those known for isocyanates, but owing to the lower reactivity of the isocyanate groups compared with that of known isocyanates of general formula $M(NCO)_x$ it is possible to control the reactions more easily. For example, the new compound $Si(OCH_2NCO)_4$ will react with a polyester and water to give a silicon-containing polyurethane foam, whereas $Si(NCO)_4$ will not give a foam with the same ester/water combination owing to the reaction being too violent.

In the examples the first illustrates the prepartion of the novel isocyanate $Si(OCH_2NCO)_4$; the second and third illustrate its reactions with compounds containing reactive hydrogen atoms, the fourth illustrates the preparation of the novel isocyanate $OP(OCH_2NCO)_3$.

Example 1

Paraformaldehyde (24 g.) and silicon tetrachloride (75 g.) were heated together in a pressure vessel at 150° C. under autogenous pressure for three hours. On fractionation of the liquid product under reduced pressure, 20 g. of tetra(chloromethyl) silicate were obtained, boiling point 144°–145° C.

Found by analysis: C, 31.3; H, 2.0; $SiO_2$, 17.0; N, 54.8%. $Si(OCH_2Cl)_4$ requires: C, 16.5; H, 2.8; $SiO_2$, 20.7; Cl, 49.0%.

32 g. of the tetra(chloromethyl) silicate was added dropwise to a stirred suspension of 145 g. silver cyanate in 400 mls. dry benzene and refluxed for 1½ hours, after which the mixture was filtered, the solids washed with benzene and the filtrate fractionated to give 16 g. of a product, boiling point 62°–66° C./2 mms. Hg.

Found by analysis: C, 31.3; H, 2.0; $SiO_2$, 17.0; N, 21.8%. $Si(OCH_2NCO)_4$ requires: C, 30.4; H, 2.5; $SiO_2$, 19.0; N, 17.7%.

The infra-red absorption spectrum showed an intense band at 4.3µ corresponding to isocyanate groups.

Example 2

5 g. of $Si(OCH_2NCO)_4$ was added to 7 g. of a branched polyester that is an ethylene glycol/glycerol/adipic acid condensation product which had previously been mixed with 3% of its weight of water and 1% of a surface-active agent "Lissapol" N ("Lissapol" is a registered trademark of Imperial Chemical Industries Limited for a nonionic surface active agent that is an octyl phenol/ethylene oxide condensation product). The mixture evolved carbon dioxide, which caused foaming, and after about three minutes a soft, white solid foam was obtained. This was heated in an oven for 15 minutes at 100° C. to complete the reaction. The foam had good resilience and showed good stability towards ultraviolet light, for example no yellowing could be detected after 24 hours' exposure to an ultraviolet lamp.

Example 3

A glass surface was coated with a thin film of ethylene glycol and then with a thin layer of $Si(OCH_2NCO)_4$. A rapid reaction took place with formation of a solid polymer that adhered firmly to the glass.

Example 4

Phosphoryl trichloride (200 g.) and paraformaldehyde (100 g.) were heated together at 140° C. in a stirred autoclave for 3 hours. On cooling 250 g. of a dark liquid was isolated which on distillation gave some unchanged $POCl_3$ together with two higher boiling fractions. The lower boiling fraction, 50°–54° C./2 mms. Hg (62.0 g.), was $OP(OCH_2Cl)_2Cl$.

Found by analysis: P, 14.9; C, 10.6; H, 2.0; Cl 50.9%. $OP(OCH_2Cl)_2Cl$ requires: P, 14.5; C, 11.2; H, 1.9; Cl, 50.0%.

The higher boiling fraction, 69°–73° C./2 mms. Hg (70 g.), was trichloromethyl phosphate $OP(OCH_2Cl)_3$.

Found by analysis: P, 12.7; C, 13.8; H, 2.2; Cl, 45.1%. $OP(OCH_2Cl)_3$ requires: P, 12.8; C, 14.8; H, 2.5; Cl, 43.8%.

40 g. of the trichloromethyl phosphate $OP(OCH_2Cl)_3$ was added dropwise to a stirred suspension of silver cyanate (88 g.) in dry benzene (300 mls). The reaction mixture was heated under reflux at 80° C. for 3 hours, then cooled and filtered. Removal of benzene from the filtrate gave 25 g. of liquid, which on distillation gave 7 g. of unchanged phosphate and 12 g. of the triisocyanate, $OP(OCH_2NCO)_3$. This requires: P, 11.8%; Cl, nil. Analysis gave: P, 12.3%; Cl, <1.0%.

What we claim is:

1. A process for making an isocyanate having the general formula $$M(OCH_2NCO)_x$$

where M is chosen from the group consisting of silicon, phosphorus and the phosphoryl radical and $x$ is respectively 4, 3 and 3 comprising in a first stage heating a halide $MQ_x$, where Q represents a hologen chosen from the group consisting of chlorine, bromine and iodine, with formaldehyde to give a halomethyl derivative having the general formula $M(OCH_2Q)_x$ and after separation reacting said halomethyl derivative with a metal cyanate selected from the group consisting of silver cyanate and sodium cyanate in an inert anhydrous solvent medium whereby halogen is replaced by the isocyanate radical.

2. A process as claimed in claim 1 in which in the first stage the halide is the chloride $MCl_x$ and it is heated with formaldehyde at a temperature from 100° to 200° C. under a pressure from 20 to 50 atmospheres.

3. A process as claimed in claim 2 in which the halide is silcon tetrachloride and the metal cyanate is silver cyanate.

4. A process as claimed in claim 2 in which the halide is phosphoryl chloride and the metal cyanate is silver cyanate.

5. An isocyanate having the formula $P(OCH_2NCO)_3$.

6. An isocyanate having the formula $OP(OCH_2NCO)_3$.

References Cited by the Examiner

FOREIGN PATENTS 1,239,198  7/60  France.

(Corresponding British—885,011, December 20, 1961)

TOBIAS E. LEVOW, *Primary Examiner.*

SAMUEL H. BLECH, *Examiner.*